United States Patent
Lim et al.

(10) Patent No.: US 10,545,618 B2
(45) Date of Patent: Jan. 28, 2020

(54) TOUCH SENSOR INCLUDING A RESONANCE PATTERN HAVING RESONANT FREQUENCY

(71) Applicant: Chung Ang University Industry Academic Cooperation Foundation, Seoul (KR)

(72) Inventors: Sung Joon Lim, Gyeonggi-do (KR); Sung Jin Choi, Seoul (KR)

(73) Assignee: CHUNG ANG UNIVERSITY INDUSTRY ACADEMIC COOPERATION FOUNDATION, Seoul (KR)

( * ) Notice: Subject to any disclaimer, the term of this patent is extended or adjusted under 35 U.S.C. 154(b) by 15 days.

(21) Appl. No.: 15/550,521

(22) PCT Filed: Feb. 16, 2016

(86) PCT No.: PCT/KR2016/001568
§ 371 (c)(1),
(2) Date: Aug. 11, 2017

(87) PCT Pub. No.: WO2016/171381
PCT Pub. Date: Oct. 27, 2016

(65) Prior Publication Data
US 2018/0052543 A1 Feb. 22, 2018

(30) Foreign Application Priority Data

Apr. 24, 2015 (KR) .................. 10-2015-0057855

(51) Int. Cl.
*G06F 3/044* (2006.01)

(52) U.S. Cl.
CPC .................. *G06F 3/044* (2013.01)

(58) Field of Classification Search
CPC .................................... G06F 3/044
See application file for complete search history.

(56) References Cited

U.S. PATENT DOCUMENTS

| 8,947,394 | B2 | 2/2015 | Lee et al. |
| 9,229,602 | B2 | 5/2016 | Lee et al. |
| 2005/0162411 | A1 | 7/2005 | Berkel van |
| 2006/0052885 | A1* | 3/2006 | Kong .............. G06F 1/1626 700/84 |
| 2013/0278542 | A1* | 10/2013 | Stephanou .......... G06F 3/0414 345/174 |

(Continued)

FOREIGN PATENT DOCUMENTS

| JP | 2013-025448 A | 2/2013 |
| KR | 10-2005-0005542 A | 1/2005 |

(Continued)

OTHER PUBLICATIONS

International Search Report for corresponding International Application No. PCT/KR2016/001568 dated Jun. 21, 2016.

(Continued)

*Primary Examiner* — Long D Pham
(74) *Attorney, Agent, or Firm* — Pearne & Gordon LLP (57) ABSTRACT

A touch sensor according to an embodiment includes: a base layer; and at least one resonance pattern formed on the base layer, wherein the resonance pattern has a resonant frequency being changed by a touch of an external structure.

13 Claims, 10 Drawing Sheets

(56) References Cited

U.S. PATENT DOCUMENTS

2016/0054853 A1* 2/2016 Hu .................. G06F 3/0412
                                                      345/174
2016/0209441 A1* 7/2016 Mazzeo ............ G01P 15/125

FOREIGN PATENT DOCUMENTS

| KR | 10-2012-0134843 A | 12/2012 |
| KR | 10-2012-0134850 A | 12/2012 |
| KR | 10-2014-0145530 A | 12/2014 |

OTHER PUBLICATIONS

Written Opinion for corresponding International Application No. PCT/KR2016/001568 dated Jun. 21, 2016.
Korean Office Action for corresponding Korean Application No. 10-2015-0058955 dated Feb. 28, 2016.

* cited by examiner

Untouched : Resonance at 0.92 GHz

Touched : Resonance at 0.83 GHz

TOUCH SENSOR INCLUDING A RESONANCE PATTERN HAVING RESONANT FREQUENCY

TECHNICAL FIELD

The present invention relates to a touch sensor.

BACKGROUND ART

Recently, touch sensors of which input is received using a method in which a finger or an input device, such as a stylus, comes into contact with an image displayed on a display apparatus are applied to various electronic products.

Recently, display apparatuses to which touch sensors are applied are being developed as flexible devices, and touch sensors are formed on a glass substrate, a plastic substrate, or the like to detect a touch in order to be applied to flexible devices.

Since a conventional touch sensor is formed as a metal electrode or the like, there is a problem in that the metal electrode is damaged when the metal electrode is bent and thus the touch sensor is damaged. In addition, when the touch sensor is formed as the metal electrode, the touch sensor needs conditions of high temperature, high pressure, vacuum, and the like, there are problems in that a manufacturing cost increases and a yield is low.

DISCLOSURE

Technical Problem

The present invention is directed to providing a touch sensor capable of detecting touch input using a resonant frequency.

Technical Solution

One aspect of the present invention provides a touch sensor including: a base layer; and at least one resonance pattern formed on the base layer, wherein the resonance pattern has a resonant frequency being changed by a touch of an external structure.

Advantageous Effects

According to an embodiment, since a touch sensor can detect touch input using a resonant frequency, there is an effect in that a touch recognition unit having a simple and convenient structure is provided.

Since the touch sensor according to an embodiment has a pattern formed on a sheet of paper by an ink-jet method, there is an effect in that a touch recognition unit in which a manufacturing cost is reduced and a yield is increased is provided.

DESCRIPTION OF DRAWINGS

The above and other objects, features and advantages of the present invention will become more apparent to those of ordinary skill in the art by describing in detail exemplary embodiments thereof with reference to the accompanying drawings, in which.

MODES OF THE INVENTION

Hereinafter, specific embodiments of the present invention will be described in detail with reference to the accompanying drawings. However, the scope of the present invention is not limited to the suggested embodiments, and other embodiments which are included in retrograde inventions or in the scope of the present invention may be easily suggested by those skilled in the art by adding, modifying, and deleting other components in the same scope of the present invention, and this may also be within the scope of the present invention.

In addition, components which are illustrated in the drawings for the embodiments and have the same function in the same scope are assigned to and described with the same reference numerals.

A touch sensor according to an embodiment includes: a base layer; and at least one resonance pattern disposed on the base layer, wherein the resonance pattern has a resonant frequency being changed by a touch of an external structure.

The resonance pattern may include a first resonance pattern and a second resonance pattern, and the first resonance pattern may have a resonant frequency different from that of the second resonance pattern.

A length of the first resonance pattern may be different from a length of the second resonance pattern.

The resonance pattern may have a spiral structure.

The resonance pattern may have a meander structure.

The external structure may have a dielectric constant.

The at least one resonance pattern may be connected to a conductive pattern.

The base layer may be a sheet of paper.

The touch sensor may further include a ground layer disposed under the base layer.

The touch sensor may further include a cover layer formed on the resonance pattern.

The cover layer may be a sheet of paper.

The resonance pattern may be formed by an inkjet printing method.

The resonance pattern may include silver nanoparticles.

The resonance pattern may be formed of a transparent conductive material.

Hereinafter, a touch sensor according to embodiments will be described with reference to the accompanying drawings.

Figure 1:
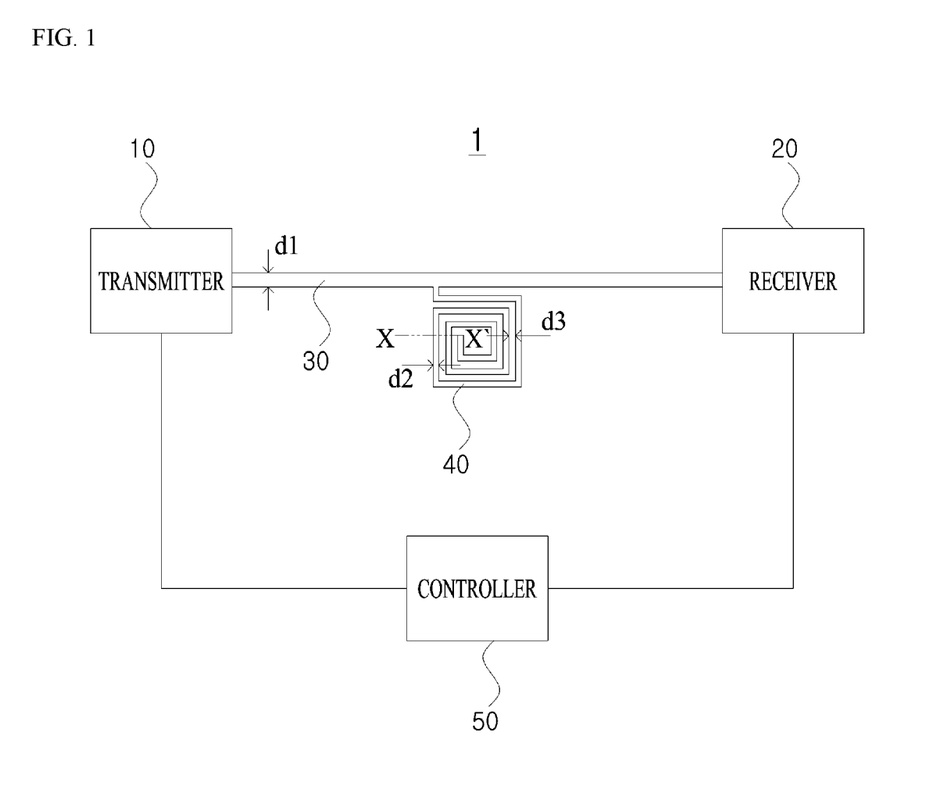
FIG. 1 is a view illustrating a touch sensor according to a first embodiment.
Figure 2:
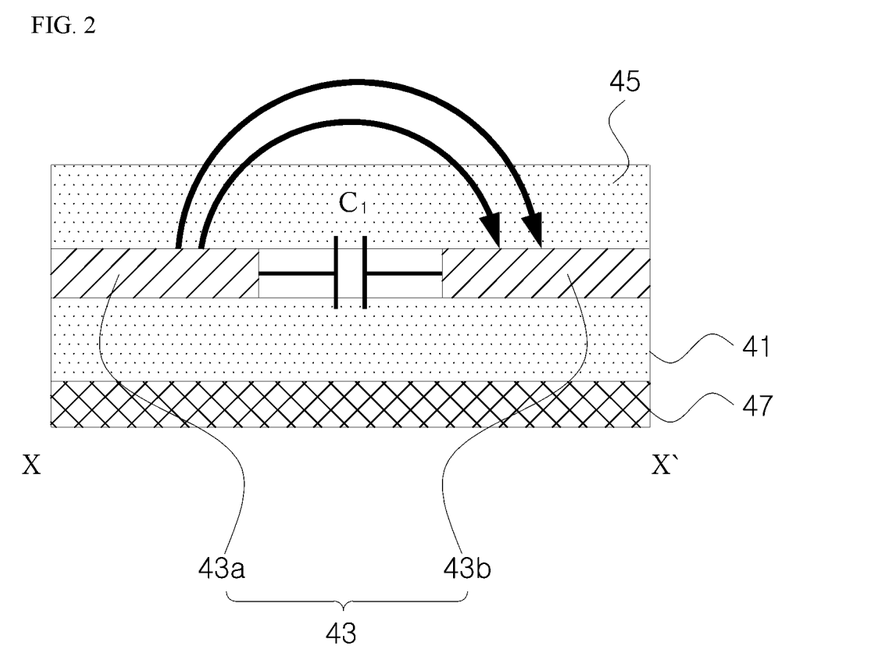
FIG. 2 is a cross-sectional view illustrating a resonance pattern according to the first embodiment.

FIG. 1 is a view illustrating a touch sensor according to a first embodiment. FIG. 2 is a cross-sectional view illustrating a resonance pattern according to the first embodiment.

Referring to FIGS. 1 and 2, a touch sensor 1 according to the first embodiment may be electrically connected to a transmitter 10 and a receiver 20.

The transmitter 10 and the receiver 20 may be electrically connected to a controller 50. The transmitter 10 may apply a voltage to the touch sensor 1. The transmitter 10 may apply an alternating current (AC) voltage to the touch sensor 1. The transmitter 10 may transmit a radio frequency (RF) signal to the touch sensor 1.

The receiver 20 may receive a voltage output through the touch sensor 1. The receiver 20 may receive the RF signal output through the touch sensor 1.

The controller 50 may detect a resonant frequency of the RF signal received from the receiver 20. The controller 50 may detect whether the touch sensor 1 is touched by detecting the resonant frequency of the RF signal received from the receiver 20.

The touch sensor 1 may include a conductive pattern 30 and a resonance pattern 40.

The conductive pattern 30 may be electrically connected to the transmitter 10 and the receiver 20. The resonance pattern 40 may be electrically connected to the conductive pattern 30. The conductive pattern 30 and the resonance pattern 40 may be integrally formed.

The resonance pattern 40 may have a spiral structure. One end of the resonance pattern 40 may be connected to the conductive pattern 30, and the other end of the resonance pattern 40 may be formed by being bent several times toward a tetragonal central portion. The resonance pattern 40 may have a tetragonal spiral structure. Since the resonance pattern 40 has the spiral structure, an inductance thereof depending on a length of the resonance pattern 40 is defined, and a capacitance thereof may be defined according to adjacent conductive layers of the resonance pattern 40. A resonant frequency of the resonance pattern 40 may be defined by the inductance and the capacitance of the resonance pattern 40.

The conductive pattern 30 may have a first width d1. The width of the conductive pattern 30 may be in the range of 1 to 1.5 mm. It is preferable that the width of the conductive pattern 30 be 1.2 mm.

The resonance pattern 40 may be formed to have a width which is less than that of the conductive pattern 30.

The resonance pattern 40 may have a second width d2. The width of the resonance pattern 40 may be in the range of 0.3 to 0.7 mm. It is preferable that the width of the resonance pattern 40 be 0.5 mm.

A gap between the adjacent conductive layers of the resonance pattern 40 may have a third width d3. The gap between the adjacent conductive layers of the resonance pattern 40 may be formed to have the same size as the width of the resonance pattern 40. That is, the second width d2 and the third width d3 may have the same value. The third width d3 may be in the range of 0.3 to 0.7 mm. It is preferable that the gap between the conductive layers of the resonance pattern 40 be 0.5 mm.

The resonance pattern 40 may include a base layer 41, a conductive layer 43, a cover layer 45, and a ground layer 47.

The conductive layer 43 may be formed on the base layer 41, the cover layer 45 may be formed on the base layer 41 on which the conductive layer 43 is applied. In addition, the ground layer 47 may be formed under the base layer 41.

The base layer 41 may be a sheet of paper.

The conductive layer 43 may include metal particles. The conductive layer 43 may include silver nanoparticles. The conductive layer 43 may be applied on the base layer 41 using an ink-jet print method. The conductive layer 43 may be formed by applying an ink including the silver nanoparticles on the base layer 41 using an ink-jet method. Since the conductive layer 43 is formed using the ink-jet method, the conductive layer 43 may be formed using a simple and convenient method at room temperature without an additional vacuum process, a high temperature process, or a high pressure process, and thus the conductive layer 43 can be formed without separate apparatuses, thereby reducing a manufacturing cost and increasing a yield.

In addition, the conductive layer 43 may include a transparent conductive material. When the conductive layer 43 includes the transparent conductive material, since the conductive layer 43 is invisible from the outside, a usage area thereof may be extended.

The resonance pattern 40 may have a gap between adjacent conductive layers 43. That is, when the adjacent conductive layers 43 are defined as a first conductive layer 43a and a second conductive layer 43b, the first conductive layer 43a and the second conductive layer 43b may be formed to have the gap. A material having a dielectric constant may be positioned in the gap between the first conductive layer 43a and the second conductive layer 43b. Since the first conductive layer 43a and the second conductive layer 43b are formed with air interposed therebetween, the first conductive layer 43a and the second conductive layer 43b may have a capacitance. The resonance pattern 40 may have a first capacitance C1.

The resonance pattern 40 may have a resonant frequency depending on a capacitance and an inductance of the resonance pattern 40.

The cover layer 45 may serve to protect the conductive layer 43. In addition, a change amount of the resonant frequency may be increased by the cover layer 45.

The ground layer 47 may serve as a ground for a signal which is transmitted through the resonance pattern 40. The ground layer 47 may be disposed on an entire area under the base layer 41, and the ground layer 47 may be electrically connected to the transmitter 10 and the receiver 20. The ground layer 47 may be electrically connected to ground structures of the transmitter 10 and the receiver 20.

Figure 3:
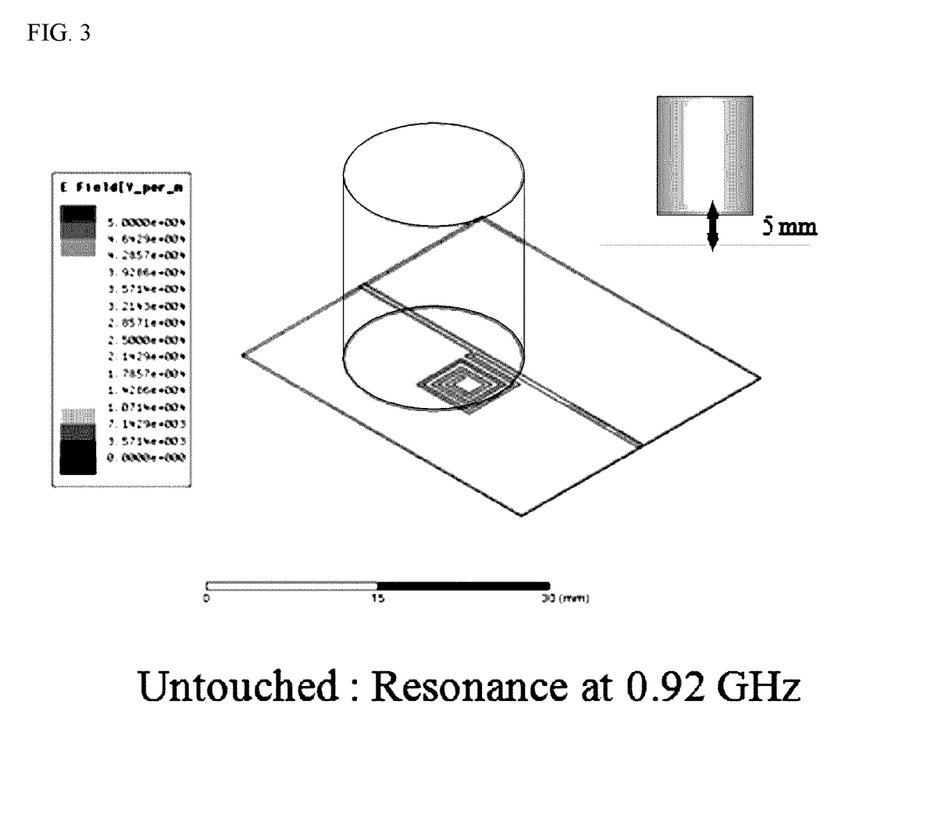
FIG. 3 is a view showing a resonant frequency of the resonance pattern according to the first embodiment.

Referring to FIG. 3, the resonance pattern 40 may have a resonant frequency. The resonance pattern 40 may have the resonant frequency depending on the inductance and the capacitance of the resonance pattern itself. The resonant frequency of the resonance pattern 40 may be, for example, 0.92 GHz.

Figure 4:
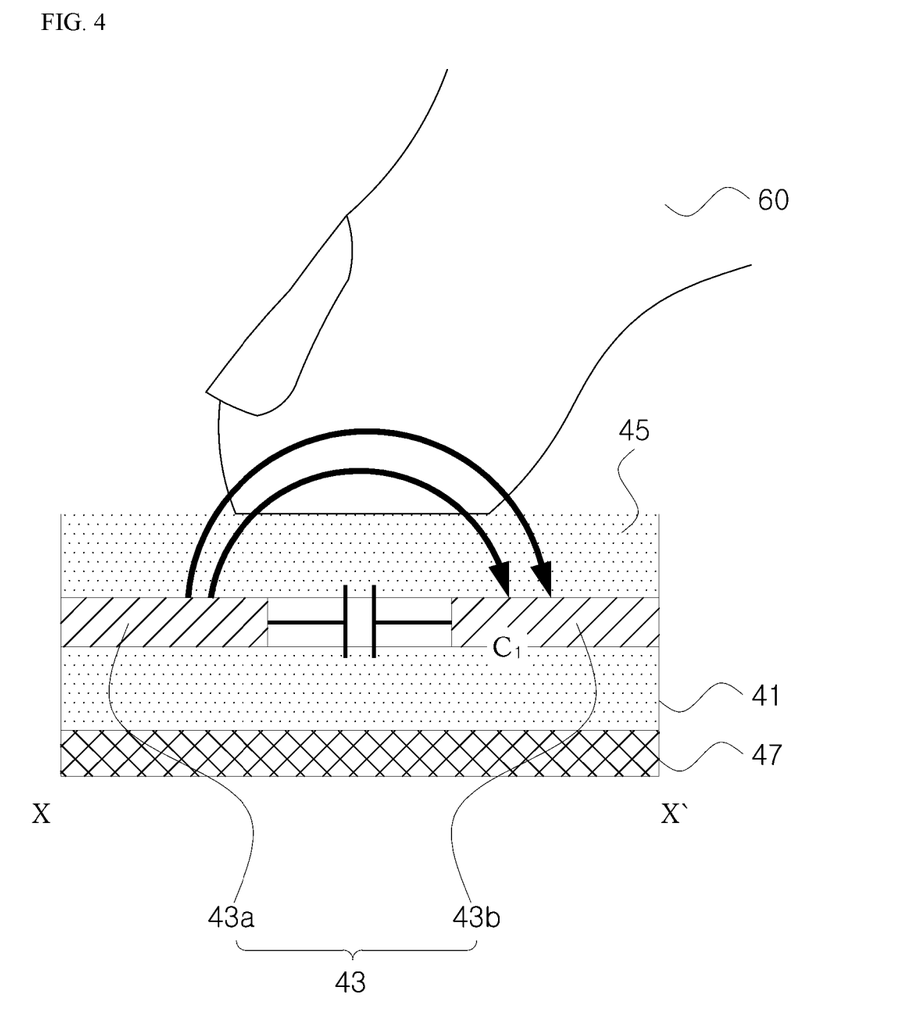
FIG. 4 is a cross-sectional view illustrating a state in which an external structure is in contact with the resonance pattern according to the first embodiment.
Figure 5:
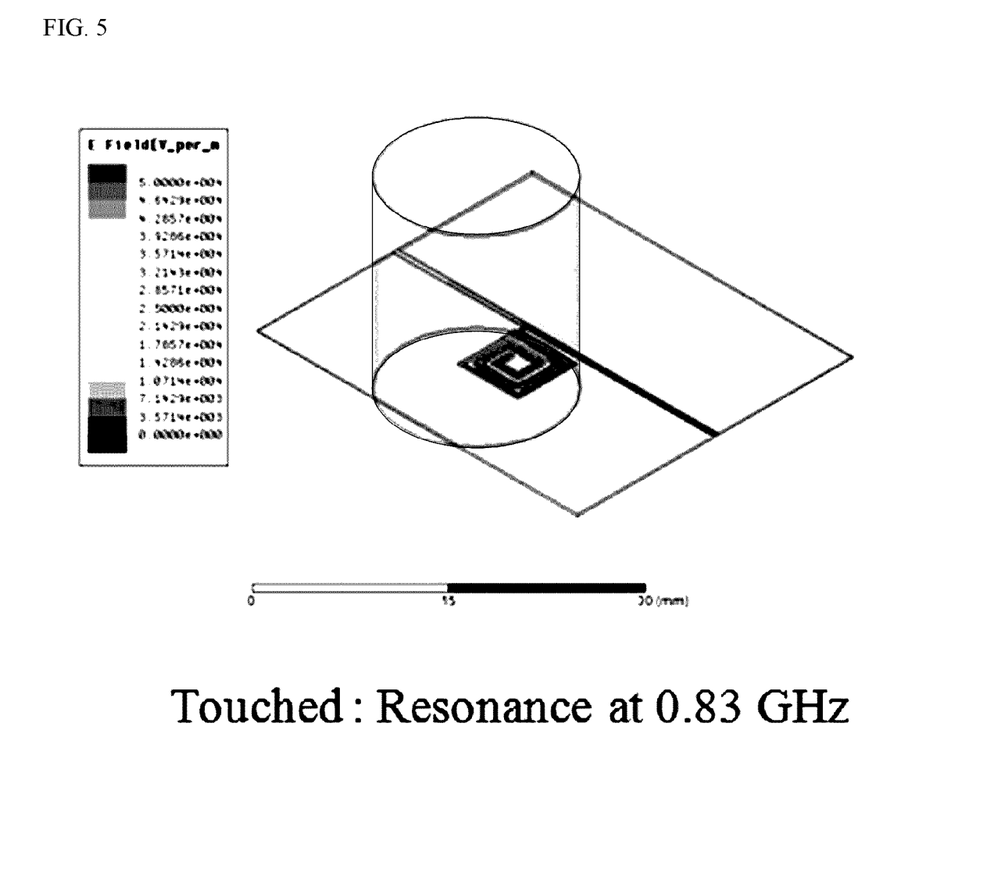
FIG. 5 is a view showing a change in resonant frequency generated when the external structure is in contact with the resonance pattern.

FIG. 4 is a cross-sectional view illustrating a state in which an external structure is in contact with the resonance pattern according to the first embodiment, and FIG. 5 is a view showing a change in resonant frequency generated when the external structure is in contact with the resonance pattern.

Referring to FIGS. 4 and 5, an external structure 60 comes into contact with the resonance pattern 40. The external structure 60 may come into contact with an upper portion of the cover layer 45.

The external structure 60 may be a structure having a dielectric constant. The external structure 60 may be a part of user's body. The external structure 60 may be a user's finger. Alternatively, the external structure 60 may be a stylus pen.

When the external structure 60 is in contact with the resonance pattern 40, the resonant frequency of the resonance pattern 40 is changed. Since the external structure 60 serves as a dielectric, a dielectric constant of the gap between the first conductive layer 43a and the second conductive layer 43b is changed, and thus a capacitance between the first conductive layer 43a and the second conductive layer 43b is changed. When the external structure 60 is in contact with the resonance pattern 40, the resonance pattern 40 may have a second capacitance C2. Since the resonant frequency is inversely proportional to a capacitance, the capacitance between the first conductive layer 43a and the second conductive layer 43b is changed, and thus the resonant frequency of the resonance pattern 40 is changed due to the change in capacitance.

As illustrated in FIG. 5, when the external structure 60 is in contact with the resonance pattern 40, the resonant frequency is changed. For example, when the external structure 60 is in contact with the resonance pattern 40, the resonant frequency is changed to 0.83 GHz.

The controller 50 may detect a change in the resonant frequency to detect whether the external structure 60 is in contact with the resonance pattern 40. As the resonant frequency measured before the external structure 60 is in contact with the resonance pattern 40 is stored in the controller 50, the controller 50 may compare a resonant frequency transmitted from the receiver 20 and the stored resonant frequency to detect whether the external structure 60 is in contact with the resonance pattern 40. The controller 50 may determine that the external structure 60 is in contact with the resonance pattern 40 when the controller 50 compares the transmitted resonant frequency and the stored resonant frequency and the resonant frequency is changed.

Figure 6:
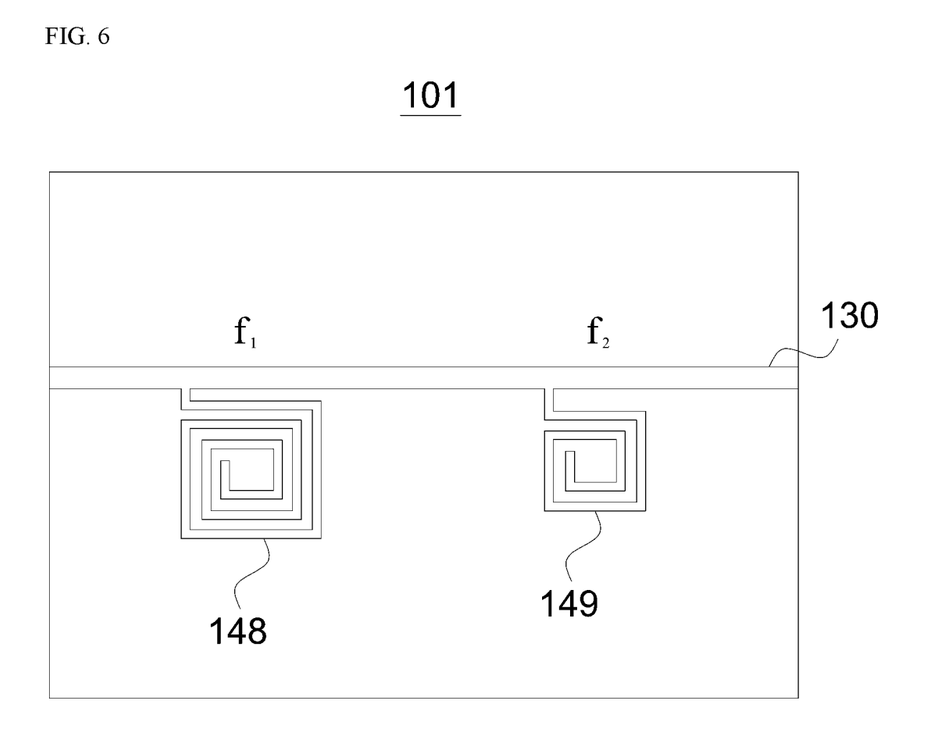
FIG. 6 is a view illustrating a touch sensor according to a second embodiment.

FIG. 6 is a view illustrating a touch sensor according to a second embodiment.

Referring to FIG. 6, a touch sensor 101 according to the second embodiment may include a conductive pattern 130, a first resonance pattern 148, and a second resonance pattern 149.

The first resonance pattern 148 may have a resonant frequency different from that of the second resonance pattern 149. The first resonance pattern 148 may have a first resonant frequency f1, and the second resonance pattern 149 may have a second resonant frequency f2.

Figure 7:
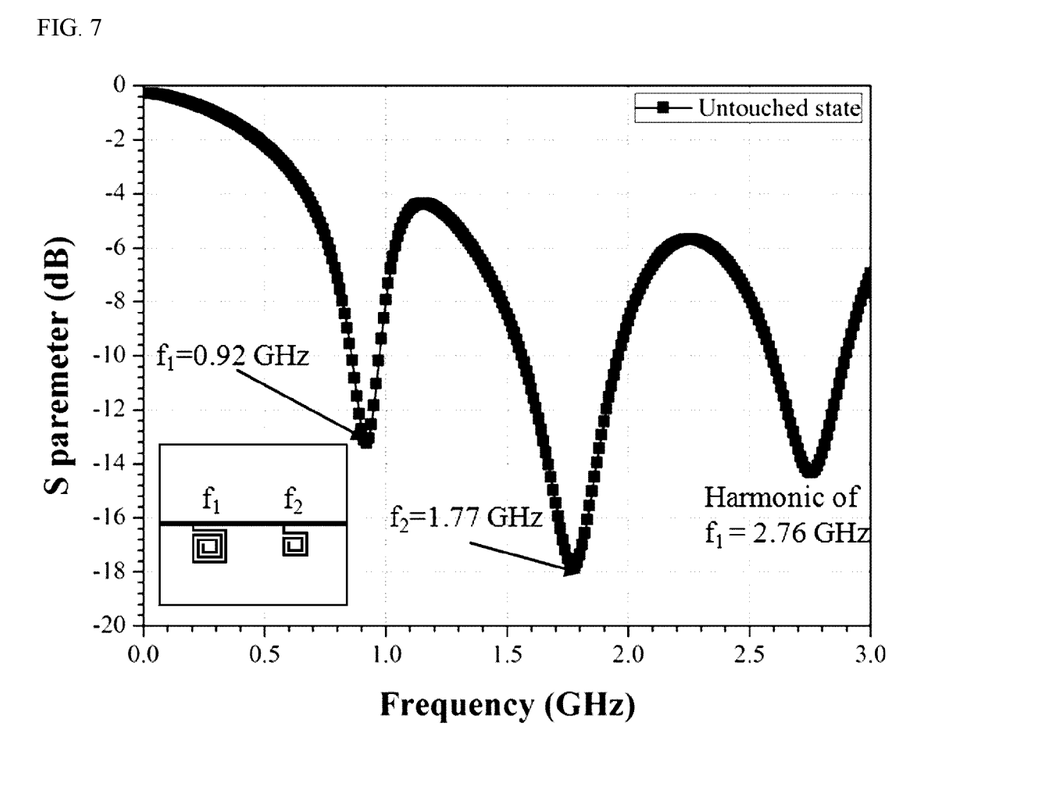
FIG. 7 is a graph showing a resonant frequency of a resonance pattern according to the second embodiment.

A value of the first resonant frequency f1 may be different from that of the second resonant frequency f2. Referring to FIG. 7, the first resonant frequency f1 may be 0.92 GHz, and the second resonant frequency f2 may be 1.77 GHz. The first resonance pattern 148 may have a harmonic frequency of the first resonant frequency f1 as well as the first resonant frequency f1. Although the second resonance pattern 149 may also have a harmonic frequency of the second resonant frequency f2, the harmonic frequency is omitted in the drawing.

The harmonic frequency of the first resonant frequency f1 may be 2.76 GHz.

A length of the first resonance pattern 148 may be different from that of the second resonance pattern 149. The first resonance pattern 148 and the second resonance pattern 149 are formed by being bent several times, and inductances thereof depending on the lengths of the first resonance pattern 148 and the second resonance pattern 149 may be determined. Since the length of the first resonance pattern 148 is different from that of the second resonance pattern 149, the inductance of the first resonance pattern 148 is different from that of the second resonance pattern 149, and since a resonant frequency is inversely proportional to an inductance, a change in resonant frequency is generated due to a change in length of the first resonance pattern 148 and the second resonance pattern 149.

The length of the first resonance pattern 148 may be greater than that of the second resonance pattern 149. Since each of the first resonance pattern 148 and the second resonance pattern 149 has a shape bent several times toward a central portion thereof, the number of bent portions of the first resonance pattern 148 may be greater than that of the second resonance pattern 149. That is, in FIG. 6, the first resonance pattern 148 may be formed to have a shape bent twelve times, and the second resonance pattern 149 may be formed to have a shape bent eight times.

The first resonance pattern 148 and the second resonance pattern 149 may be electrically connected to one conductive pattern 130. The conductive pattern 130 is connected to a transmitter and a receiver, a RF signal transmitted from the transmitter is received by the receiver, and a controller may detect a resonant frequency using the RF signal.

Figure 8:
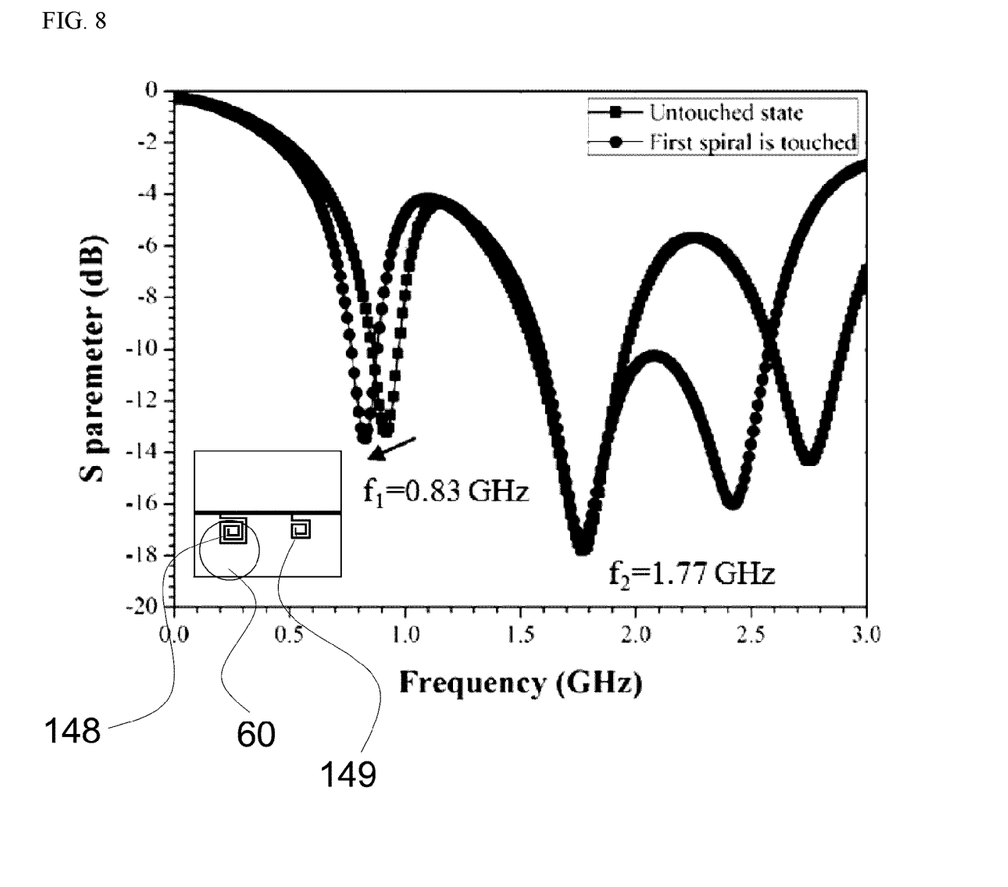
FIG. 8 is a graph showing a change in frequency when an external structure is in contact with a first resonance pattern.
Figure 9:
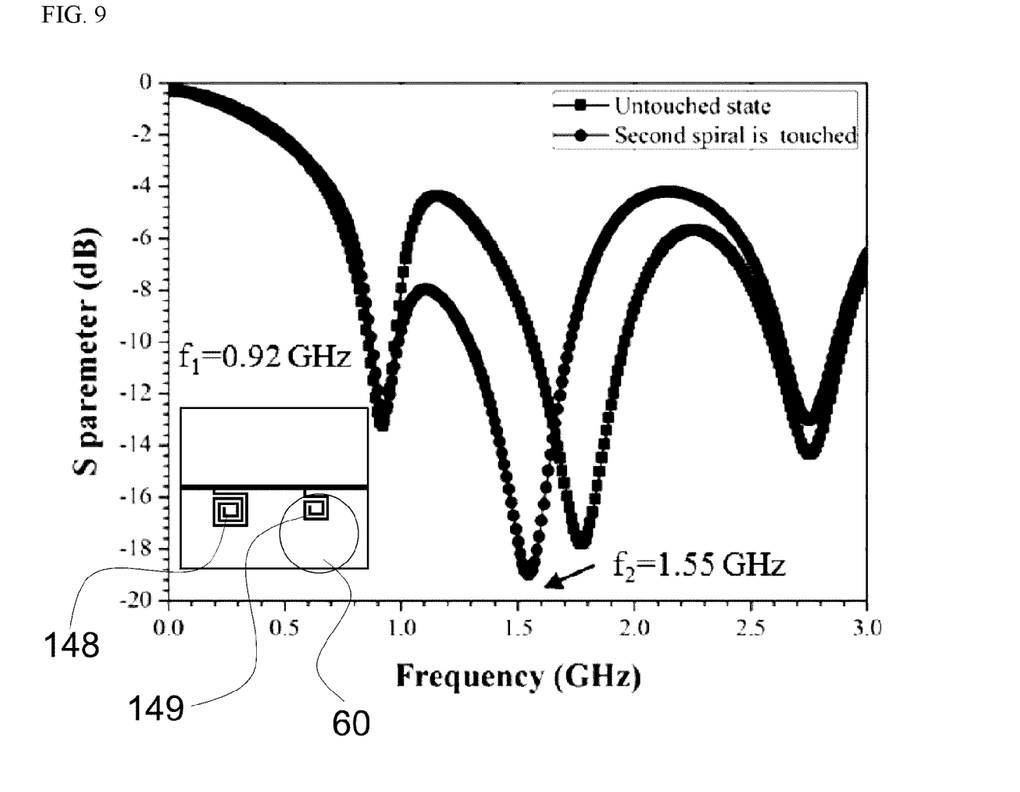
FIG. 9 is a graph showing a change in frequency when the external structure is in contact with a second resonance pattern.

FIG. 8 is a graph showing a change in frequency when an external structure is in contact with a first resonance pattern, and FIG. 9 is a graph showing a change in frequency when the external structure is in contact with a second resonance pattern.

FIG. 8 is the graph showing the change in frequency when an external structure 60 is in contact with the first resonance pattern 148. The first resonant frequency f1 of the first resonance pattern 148 before the external structure 60 is in contact therewith is 0.92 GHz, and the resonant frequency is changed when the external structure 60 is in contact with the first resonance pattern 148. When the external structure 60 is in contact with the first resonance pattern 148, the first resonant frequency f1 is changed to 0.83 GHz. A harmonic frequency of the first resonant frequency f1 is also changed. At this time, the second resonant frequency f2 of the second resonance pattern 149 is maintained at 1.77 GHz.

FIG. 9 is the graph showing the change in frequency when the external structure 60 is in contact with the second resonance pattern 149. The second resonant frequency f2 of the second resonance pattern 149 before the external structure 60 is in contact with the second resonance pattern 149 is 1.77 GHz. When the external structure 60 is in contact with the second resonance pattern 149, the resonant frequency thereof is changed. When the external structure 60 is in contact with the second resonance pattern 149, the second resonant frequency f2 is changed to 1.55 GHz. Although not illustrated in the drawing, a harmonic frequency of the second resonant frequency f2 is also changed. At this time, the first resonant frequency f1 of the first resonance pattern 148 is maintained at 0.92 GHz, and the harmonic frequency of the first resonant frequency f1 is also maintained at 2.76 GHz.

The controller may measure a change in resonant frequency to detect which area is touched by the external structure. When a change in the first resonant frequency f1 is measured, it may be determined that the external structure is in contact with the first resonance pattern 148, and when a change in the second resonant frequency f2 is measured, it may be determined that the external structure is in contact with the second resonance pattern 149.

Although two resonance patterns connected to one conductive pattern are exemplarily described in the embodiment, two or more resonance patterns may be connected to one conductive pattern, resonant frequencies of the resonance patterns may be set to be different, and thus a touch of the external structure may be detected at a plurality of areas.

In addition, as a plurality of conductive patterns are formed in parallel, the resonance patterns connected to the plurality of conductive patterns are formed, and the resonant frequencies of the resonance patterns are set to be different, a touch of the external structure may be detected at a two dimensional surface. That is, the plurality of conductive patterns and the resonant frequencies may realize the touch sensor configured to detect touch input on the surface using the plurality of different resonance patterns.

Figure 10:
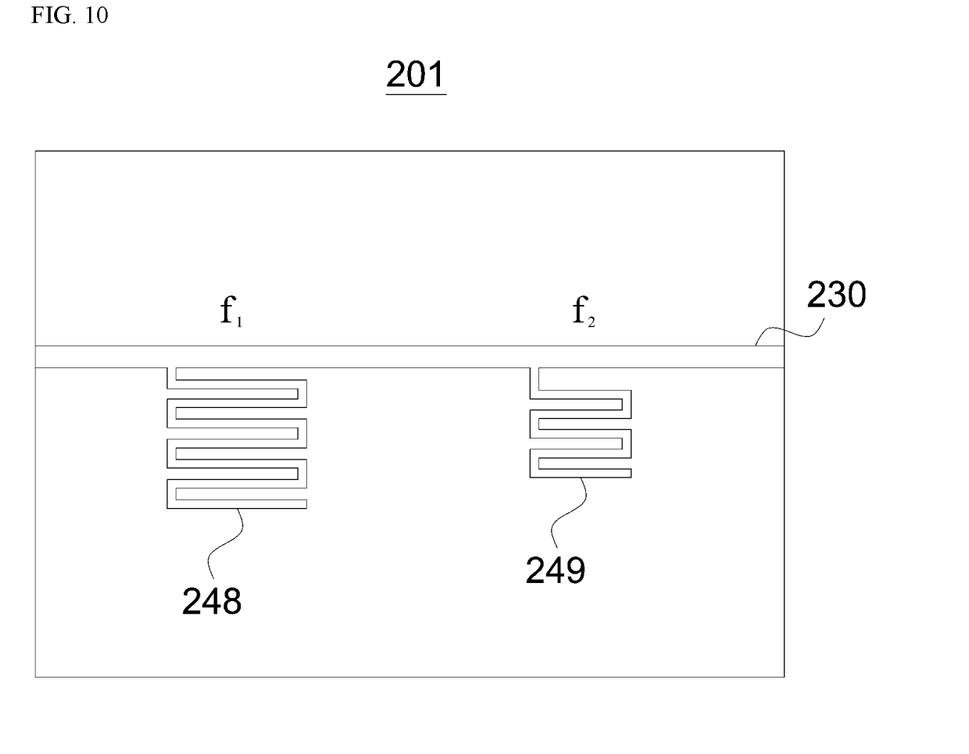
FIG. 10 is a view illustrating a touch sensor according to a third embodiment.

FIG. 10 is a view illustrating a touch sensor according to a third embodiment.

The touch sensor according to the third embodiment has a resonance pattern having a shape different from those of the first and second embodiments but has the same remaining structure as those of the first and second embodiments. Accordingly, in a description of the third embodiment, components which are the same as those of the first and second embodiments are assigned to the same reference numerals, and the detail descriptions thereof will be omitted.

Referring to FIG. 10, a touch sensor 201 according to the third embodiment may include a conductive pattern 230, a first resonance pattern 248, and a second resonance pattern 249.

The first resonance pattern 248 and the second resonance pattern 249 may be electrically connected to the conductive pattern 230.

The first resonance pattern 248 and the second resonance pattern 249 may have meander structures. A length of the first resonance pattern 248 may be different from that of the second resonance pattern 249. A resonant frequency of the first resonance pattern 248 may be different from that of the second resonance pattern 249.

The length of the first resonance pattern 248 may be greater than that of the second resonance pattern 249. The first resonance pattern 248 may be formed to have more bent times than those of the second resonance pattern 249. The number of bent portions of the first resonance pattern 248 may be greater than that of the second resonance pattern 249.

One ends of the first resonance pattern 248 and the second resonance pattern 249 may be in contact with the conductive pattern 230, and the first resonance pattern 248 and the second resonance pattern 249 may be formed by alternately extending in vertical and horizontal directions of the conductive pattern 230. At this time, portions at which the first resonance pattern 248 and the second resonance pattern 249 are bent from a vertical direction to a horizontal direction or from the horizontal direction to the vertical direction of the conductive pattern 230 may be defined as the bent portions.

Since the length of the first resonance pattern 248 is different from that of the second resonance pattern 249, an inductance of the first resonance pattern 248 is different from that of the second resonance pattern 249, and as a result, the first resonance pattern 248 and the second resonance pattern 249 are designed to have different resonant frequencies. A touch area of an external structure can be detected though the different resonant frequencies and can be operated as a touch sensor.

While the structures and features of the present invention have been described on the basis of the embodiments of the present invention, the present invention is not limited thereto, it is apparent to those skilled in the art that the present invention may be variously modified or changed in the scope of the present invention, and accordingly it is clear that such modifications or changes are within the scope of the appended claims.

The invention claimed is:

1. A touch sensor comprising:
   a base layer;
   a conductive pattern formed on the base layer;
   a transmitter configured to transmit a first radio frequency signal to the conductive pattern;
   at least one resonance pattern formed on the base layer, the at least one resonance pattern having a predetermined resonant frequency being set by the shape of the resonance pattern; and
   a receiver configured to receive a second radio frequency signal from the conductive pattern,
   wherein the second radio frequency signal includes a resonant frequency changed from the predetermined resonant frequency by a touch of external structure,
   wherein the at least one resonance pattern includes adjacent conductive layers located at a same layer,
   wherein the predetermined resonant frequency of the resonance pattern is defined by a capacitance of the resonance pattern,
   wherein the capacitance of the resonance pattern is defined based on the adjacent conductive layers and a gap between the adjacent conductive layers of the resonance pattern.

2. The touch sensor of claim 1,
   wherein the resonance pattern includes a first resonance pattern and a second resonance pattern; and
   wherein the first resonance pattern has a resonant frequency different from that of the second resonance pattern.

3. The touch sensor of claim 2,
   wherein a length of the first resonance pattern is different from a length of the second resonance pattern.

4. The touch sensor of claim 1,
   wherein the resonance pattern has a spiral structure.

5. The touch sensor of claim 1,
   wherein the resonance pattern has a meander structure.

6. The touch sensor of claim 1,
   wherein the external structure has a dielectric constant.

7. The touch sensor of claim 1,
   wherein the base layer includes a sheet of paper.

8. The touch sensor of claim 1, further comprising a ground layer disposed under the base layer.

9. The touch sensor of claim 1, further comprising a cover layer formed on the resonance pattern.

10. The touch sensor of claim 9,
    wherein the cover layer includes a sheet of paper.

11. The touch sensor of claim 1,
    wherein the resonance pattern is formed by an ink-jet printing method.

12. The touch sensor of claim 1,
    wherein the resonance pattern includes silver nanoparticles.

13. The touch sensor of claim 1,
    wherein the resonance pattern is formed of transparent conductive materials.

* * * * *